US012475861B2

(12) United States Patent
Chen et al.

(10) Patent No.: US 12,475,861 B2
(45) Date of Patent: Nov. 18, 2025

(54) LIQUID CRYSTAL DISPLAY PANEL AND COMPENSATION METHOD THEREOF

(71) Applicant: TCL CHINA STAR OPTOELECTRONICS TECHNOLOGY CO., LTD., Guangdong (CN)

(72) Inventors: Xinhong Chen, Guangdong (CN); Yun Zhang, Guangdong (CN); Ling Xu, Guangdong (CN); Wenli Wang, Guangdong (CN); Lu Liu, Guangdong (CN); Yuying Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,326

(22) Filed: Dec. 29, 2023

(65) Prior Publication Data

US 2025/0118272 A1 Apr. 10, 2025

(30) Foreign Application Priority Data

Oct. 9, 2023 (CN) ........................ 202311301854.9

(51) Int. Cl.
*G09G 3/36* (2006.01)

(52) U.S. Cl.
CPC ......... *G09G 3/3607* (2013.01); *G09G 3/3614* (2013.01); *G09G 2300/0452* (2013.01); *G09G 2320/0247* (2013.01); *G09G 2320/0673* (2013.01)

(58) Field of Classification Search
None
See application file for complete search history.

(56) References Cited

U.S. PATENT DOCUMENTS

| | | | | |
|---|---|---|---|---|
| 2014/0104155 A1 | 4/2014 | Long | | |
| 2016/0171936 A1* | 6/2016 | Wang | G09G 3/3655 | 345/89 |
| 2016/0189656 A1* | 6/2016 | Park | G09G 3/006 | 345/694 |

FOREIGN PATENT DOCUMENTS

| | | | |
|---|---|---|---|
| CN | 101136188 A | 3/2008 | |
| CN | 103400563 A | 11/2013 | |
| KR | 20080032694 A | 4/2008 | |
| WO | 2018014416 A1 | 1/2018 | |

OTHER PUBLICATIONS

Chinese Office Action issued in corresponding Chinese Patent Application No. 202311301854.9 dated Oct. 9, 2025, pp. 1-10.

* cited by examiner

*Primary Examiner* — Ifedayo B Iluyomade
(74) *Attorney, Agent, or Firm* — PV IP PC; Wei Te Chung

(57) ABSTRACT

The present disclosure discloses a liquid crystal display panel and a compensation method thereof. The compensation method firstly acquires a plurality of consecutive and alternating odd-numbered frame grayscale data and even-numbered frame grayscale data, then determines a minimum grayscale difference, and determines a gamma voltage difference corresponding to the grayscale difference according to a curve of a relation between grayscales and gamma voltages, followed by obtaining a correction value for a common voltage based on the gamma voltage difference. The flicker phenomena can be improved by adjusting the common voltage only once with the correction value.

18 Claims, 9 Drawing Sheets

LIQUID CRYSTAL DISPLAY PANEL AND COMPENSATION METHOD THEREOF

CROSS-REFERENCE TO RELATED APPLICATION

This application claims priority to and the benefit of Chinese Patent Application No. 202311301854.9, filed on Oct. 9, 2023, the disclosure of which is incorporated herein by reference in its entirety.

TECHNICAL FIELD

The present disclosure relates to the field of display technologies, and more particularly, to a liquid crystal display panel and a compensation method thereof.

BACKGROUND

The liquid crystal display panel is driven by alternating currents. Since input signals of positive half-cycles and negative half-cycles are affected by feed-through voltages, liquid crystal clamp voltages during the positive half-cycles and the negative half-cycles are caused to be different, which leads to different screen luminance. Thus, there exists flicker phenomena.

The above flicker is generally adjusted using a fixed pattern. A flicker value is measured by a respective optical instrument. This process usually requires stepwise approximation from several times of "common voltage adjustment—flicker value measurement". For example, the dichotomy employed in the related art requires about eight times of iterations to obtain a desired flicker value, which leads to the problem that flicker adjustments require multiple iterations.

SUMMARY

In a first aspect, the present disclosure provides a compensation method for a liquid crystal display panel including a plurality of pixel cells arranged in an array, each pixel cell including a plurality of sub-pixels having alternating polarities in a row direction and a column direction. The compensation method includes acquiring a plurality of consecutive and alternating odd-numbered frame grayscale data and even-numbered frame grayscale data, every two adjacent pixel cells of the plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data; determining a minimum grayscale difference between every adjacent pixel cells based on one of the odd-numbered frame grayscale data or the even-numbered frame grayscale data; determining a gamma voltage difference corresponding to the grayscale difference according to a curve of a relation between grayscales and gamma voltages; and obtaining a correction value for a common voltage based on the gamma voltage difference.

In a second aspect, the present disclosure provides a liquid crystal display panel that performs a compensation method, where the liquid crystal display panel includes a plurality of pixel cells arranged in an array, each pixel cell including a plurality of sub-pixels having alternating polarities in a row direction and a column direction, the compensation method including: acquiring a plurality of consecutive and alternating odd-numbered frame grayscale data and even-numbered frame grayscale data, every two adjacent pixel cells of the plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data; determining a minimum grayscale difference between every adjacent pixel cells based on one of the odd-numbered frame grayscale data or the even-numbered frame grayscale data; determining a gamma voltage difference corresponding to the grayscale difference according to a curve of a relation between grayscales and gamma voltages; and obtaining a correction value for a common voltage based on the gamma voltage difference.

BRIEF DESCRIPTION OF THE DRAWINGS

The technical solution and other beneficial effects of the present disclosure will be apparent from the following detailed description of specific embodiments thereof, taken in conjunction with the accompanying drawings.

DETAILED DESCRIPTION

The technical solution in the embodiments of the present disclosure will be clearly and completely described with reference to the accompanying drawings of the embodiments of the present disclosure. Obviously, the described embodiments are only some of the embodiments of the present disclosure, but not all of the embodiments. Based on the embodiments of the present disclosure, all other embodiments obtained by those skilled in the art without making creative efforts fall within the scope of protection of the present disclosure.

Furthermore, the terms "first" and "second" are used for descriptive purposes only and are not to be construed as indicating or implying relative importance or implicitly indicating the number of indicated technical features, such that the features defining with "first" and "second" may explicitly or implicitly include one or more of the recited features. In the description of the present disclosure, "a plurality of" is meant to mean two or more unless expressly and specifically defined otherwise.

Since a liquid crystal display panel is driven by alternating currents, the input signals of the positive half-cycles and the negative half-cycles are affected by the feed-through voltages, so that the liquid crystal clamp voltages during the positive half-cycles and the negative half-cycles are caused to be different, which leads to different screen luminance. Thus, there exists flicker phenomena.

Figure 1:
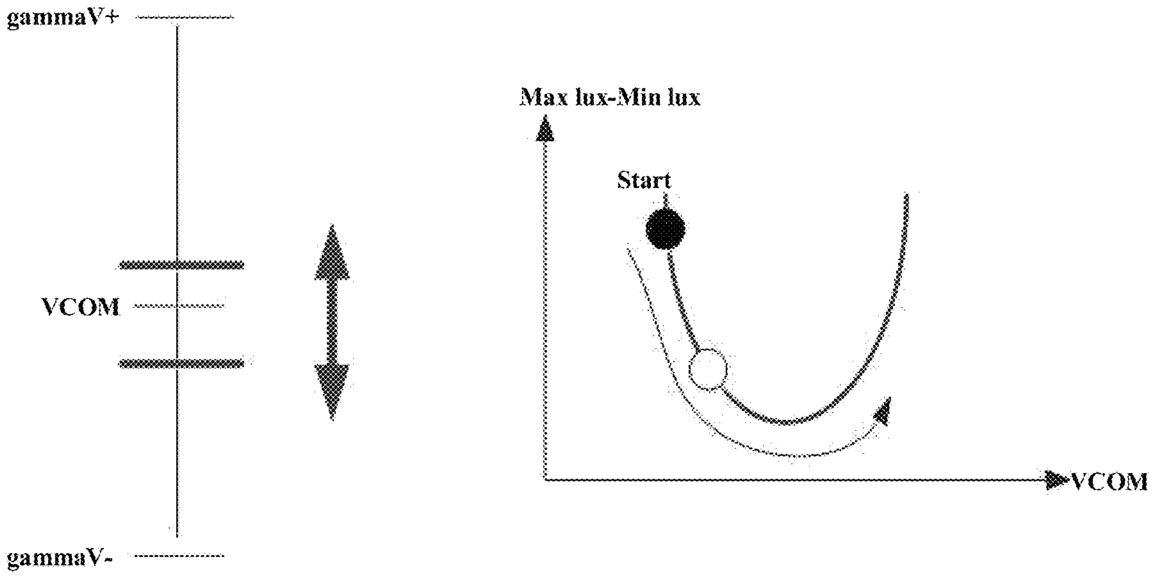
FIG. 1 is a schematic diagram of a relation between a common voltage, a gamma voltage, and luminance in the related art.

Therefore, by adopting the adjustment of common voltage (VCOM) as shown in the left figure of FIG. 1, the liquid crystal clamp voltages during the positive and negative half-cycles are balanced, so that the flicker value is reduced. The liquid crystal clamp voltage during the positive half-circles is (gammaV+)−VCOM. The liquid crystal clamp voltage during the negative half-cycles is VCOM−(gammaV−). GammaV+ is a gamma voltage during the positive half-cycles, and gammaV− is a gamma voltage during the negative half-cycles.

The adjustment of the flicker value is in fact to find a common voltage to minimize the flicker value (a valley of a curve), as shown in the right figure in FIG. 1. Specifically, as the common voltage increases, the luminance difference (Max lux-Min lux) changes from an initial maximum luminance difference to a minimum luminance difference, and then again changes to the maximum luminance difference. The valley of the curve corresponds to the minimum luminance difference, and at this point, the corresponding common voltage can make the liquid crystal clamp voltages during the positive and negative half-cycles approximate or equal, thereby reducing the flicker value.

Figure 2:
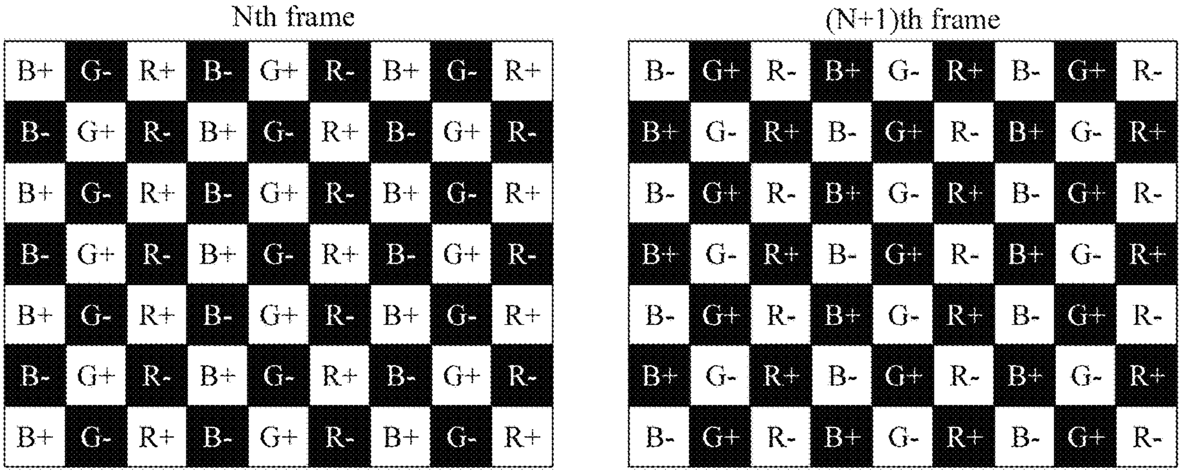
FIG. 2 is a schematic structural diagram of a fixed pattern used for flicker adjustment in the related art.

The adjustment of the flicker value is generally performed using a fixed flicker pattern for flicker value adjustment as shown in FIG. 2, which is determined by a drive architecture of the liquid crystal display panel. The pattern shown in FIG. 2 shows a positive polarity in a Nth frame and a negative polarity in a (N+1)th frame, whereby the flicker value is calculated by measuring a luminance difference between the Nth frame and the (N+1)th frame. It will be appreciated that the smaller the flicker value, the better, which means that the luminance difference between the Nth frame and (N+1)th frame needs to be as small as possible to improve the display effect.

Figure 3:
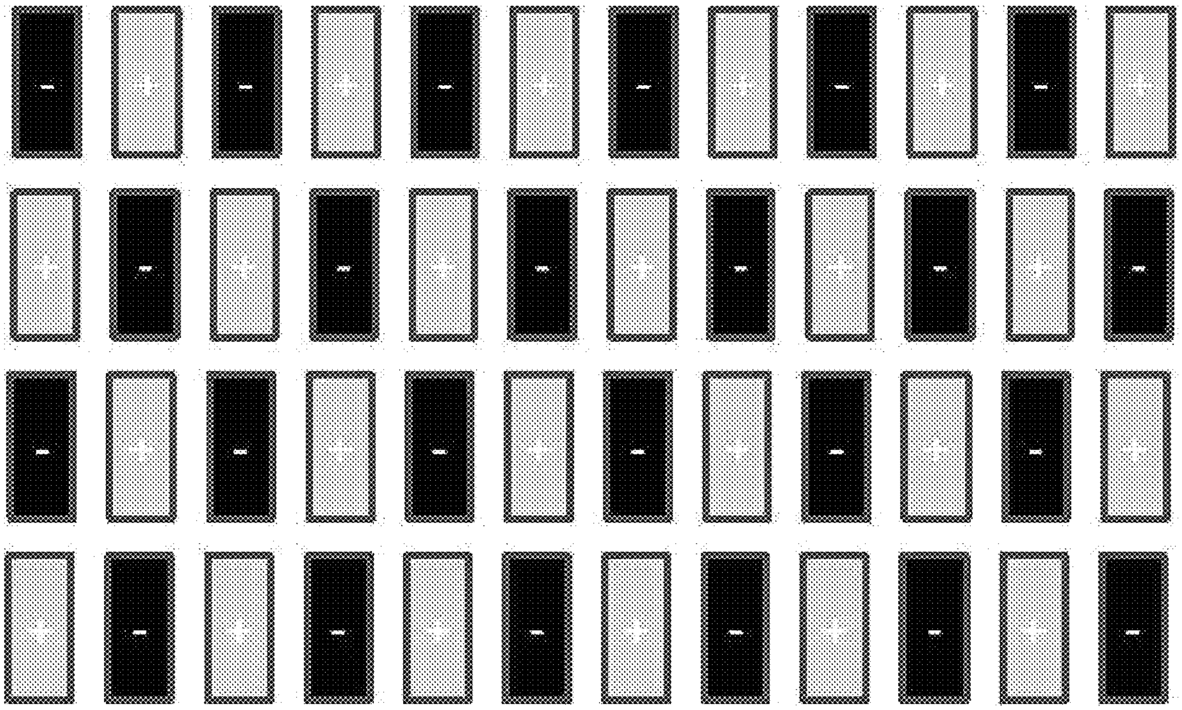
FIG. 3 is a schematic structural diagram of another fixed pattern used for flicker adjustment in the related art.

The sub-pixel arrangement shown in FIG. 3 is another fixed flicker pattern for flicker value adjustment. Compared with FIG. 2, the display colors (RGB) of individual sub-pixels may be ignored in FIG. 3 where each block represents one sub-pixel.

Figure 4:
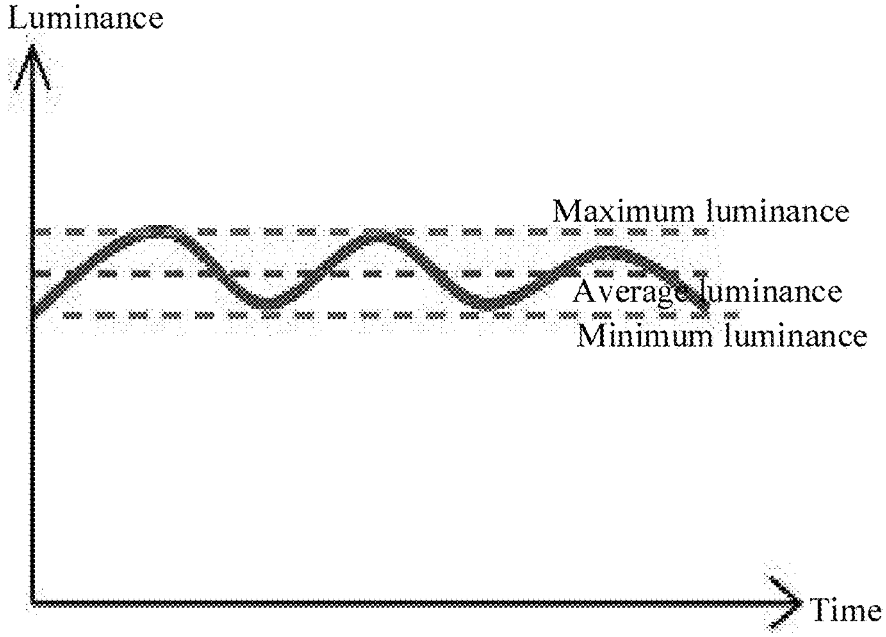
FIG. 4 is a schematic diagram of calculation of flicker values by optical instruments in the related art.

The measurement of the flicker value is accomplished by a camera model CA310 or other optical instruments that support flicker value measurement. Specifically, FIG. 4 illustrates a method for calculating a flicker value by taking the camera CA310 as an example, as follows:

$$\text{flicker} = (\max - \min)/((\max + \min)/2) * 100\%$$

where flicker is the flicker value, max is the maximum luminance, and min is the minimum luminance.

However, with the above method, a minimum flicker value cannot be obtained by adjusting the common voltage at one time, and this process usually requires stepwise approximation from several times of "common voltage adjustment—flicker value measurement". The dichotomy currently employed requires about eight times of iterations to obtain a small flicker value.

Therefore, in view of the above-mentioned technical problem that adjustment of the flicker value requires multiple iterations, the present embodiment provides a liquid crystal display panel. Referring to FIGS. 5 to 16, the liquid crystal display panel includes a plurality of pixel cells arranged in an array, and each pixel cell includes a plurality of sub-pixels having alternating polarities in a row direction and a column direction.

Figure 5:
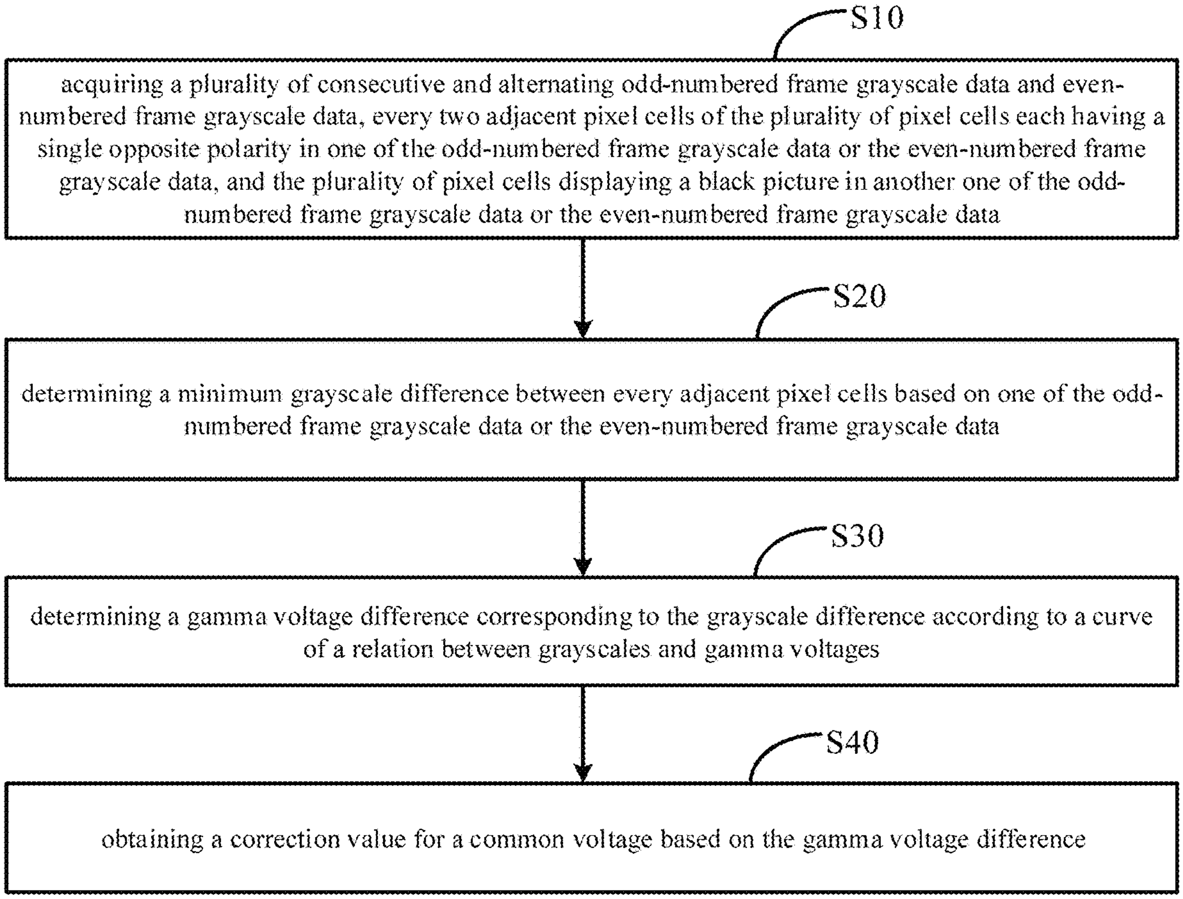
FIG. 5 is a schematic flow diagram of a compensation method according to an embodiment of the present disclosure.

As shown in FIG. 5, a compensation method for the liquid crystal display panel includes steps S10 to S40.

At step S10, a plurality of consecutive and alternating odd-numbered frame grayscale data and even-numbered frame grayscale data is acquired. Every two adjacent pixel cells of the plurality of pixel cells each have a single opposite polarity in one of the odd-numbered frame grayscale data or the even-numbered frame grayscale data. The plurality of pixel cells displays a black picture in another one of the odd-numbered frame grayscale data or the even-numbered frame grayscale data.

At step S20, a minimum grayscale difference between every adjacent pixel cells is determined based on one of the odd-numbered frame grayscale data or the even-numbered frame grayscale data.

At step S30, a gamma voltage difference corresponding to the grayscale difference is determined according to a curve of a relation between grayscales and gamma voltages.

At step S40, a correction value of the common voltage is obtained based on the gamma voltage difference.

It will be appreciated that according to the compensation method of the present embodiment, a plurality of consecutive and alternating odd-numbered frame grayscale data and even-numbered frame grayscale data is acquired in the first place, with every two adjacent pixel cells of a plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data. A minimum grayscale difference between every adjacent pixel cells is determined based on one of the odd-numbered frame grayscale data or the even-numbered frame grayscale data. Then, a gamma voltage difference corresponding to the grayscale difference is determined according to a curve of a relation between grayscales and gamma voltages, followed by obtaining a correction value for a common voltage based on the gamma voltage difference. A flicker phenomenon can be improved by adjusting the common voltage only once through the correction value without requiring multiple iterations with low efficiency.

Also, the improvement in flicker can also be accomplished by dynamic pictures such as a plurality of consecutive and alternating odd-numbered frame grayscale data and even-numbered frame grayscale data, which extends types of flicker pattern required to adjust the flicker, as compared to the case where flicker is generally adjusted using a fixed flicker pattern.

Also, a plurality of consecutive and alternating odd-numbered frame grayscale data and even-numbered frame grayscale data can be acquired by one shot of a camera. A corresponding grayscale difference that can be identified based on the odd-numbered frame grayscale data and even-numbered frame grayscale data is used as a basis for determining the magnitude of a flicker value, which reduces the frequency of usage of an optical instrument compared with the conventional way in which the flicker value is measured by the corresponding optical instrument, thereby improving the efficiency of flicker adjustment.

It should be noted that in the present embodiment, the flicker value can be reduced by adjusting the common voltage only once without requiring multiple iterations with low efficiency, which improves the adjustment efficiency and further facilitates the improvement of production capacity of the liquid crystal display panel per unit time.

Figure 6:
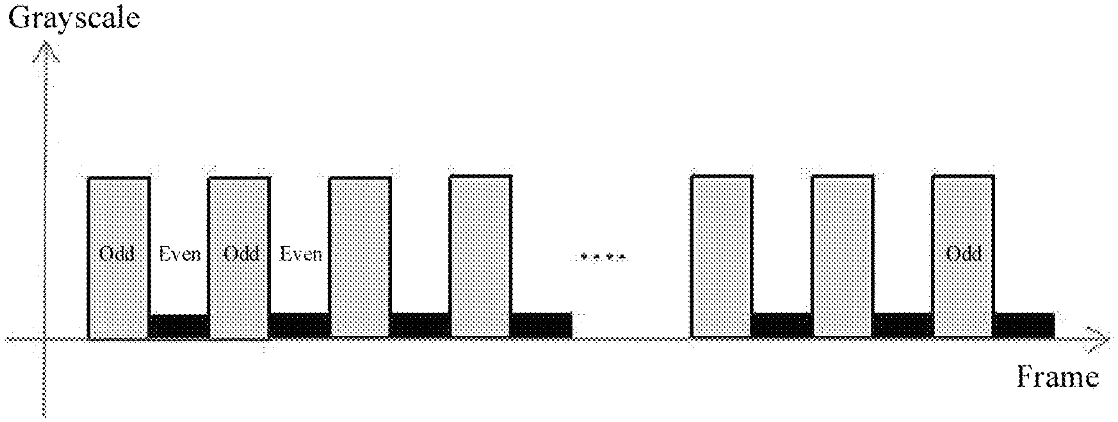
FIG. 6 is a schematic diagram of frame grayscale data according to an embodiment of the present disclosure.

The plurality of consecutive and alternating odd-numbered frame grayscale data and even-numbered frame grayscale data is shown in FIG. 6, where the first frame may be odd-numbered frame grayscale data, the second frame may be even-numbered frame grayscale data, the third frame may be odd-numbered frame grayscale data, and the fourth frame may be even-numbered frame grayscale data, and so on so forth.

FIG. 6 is an example of two adjacent pixel cells each having a single opposite polarity in the odd-numbered frame grayscale data, and a plurality of pixel cells displaying a black picture in the even-numbered frame grayscale data. In other embodiments, two adjacent pixel cells each have a single opposite polarity in the even-numbered frame grayscale data, and a plurality of pixel cells display a black picture in the odd-numbered frame grayscale data.

Figure 7:
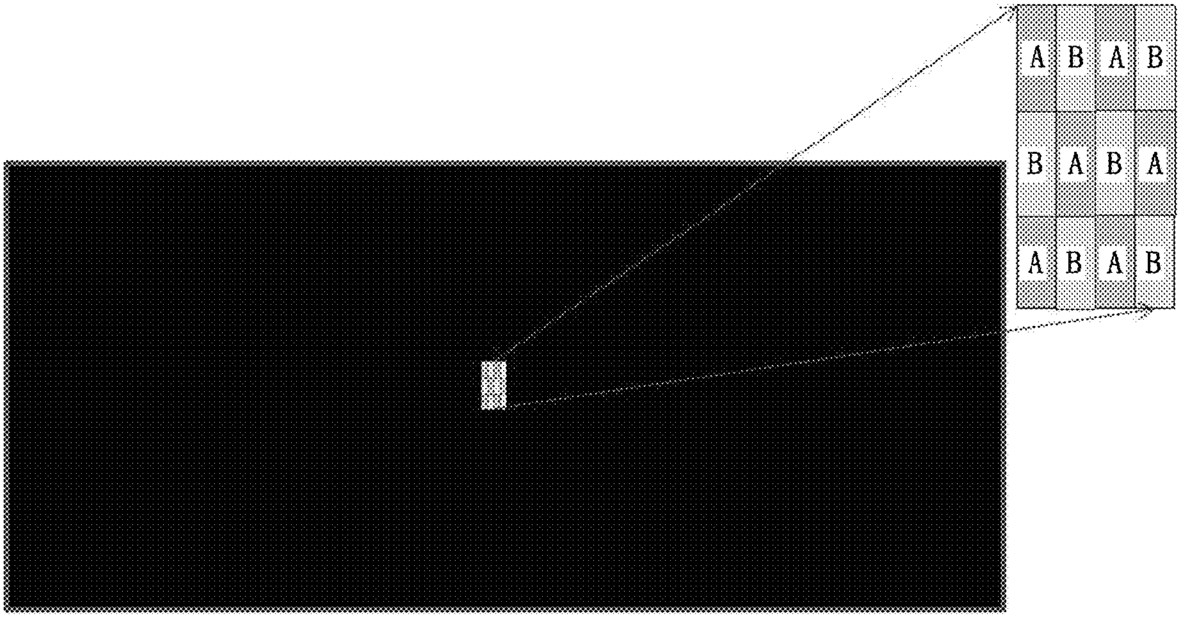
FIG. 7 is a schematic diagram of a distribution of pixel cells according to an embodiment of the present disclosure.

The plurality of pixel cells arranged in an array may be located in a middle region or a central region of the liquid crystal display panel as shown in FIG. 7, so that the flicker may be improved by fewer pixel cells rather than by all sub-pixels, thereby reducing the amount of data processing.

In FIG. 7, letter A denotes a pixel cell showing one polarity, and letter B denotes a pixel cell showing another polarity. The one polarity may be one of a positive polarity or a negative polarity, and the another polarity may be the other one of the positive polarity or the negative polarity. For example, in the case where the one polarity is the positive polarity, the another polarity is the negative polarity. Alternatively, in the case where the one polarity is the negative polarity, the another polarity is the positive polarity.

As can be seen from FIG. 7, these pixel cells are arranged in an ABAB manner in a row direction and in an ABA manner in a column direction.

Figure 8:
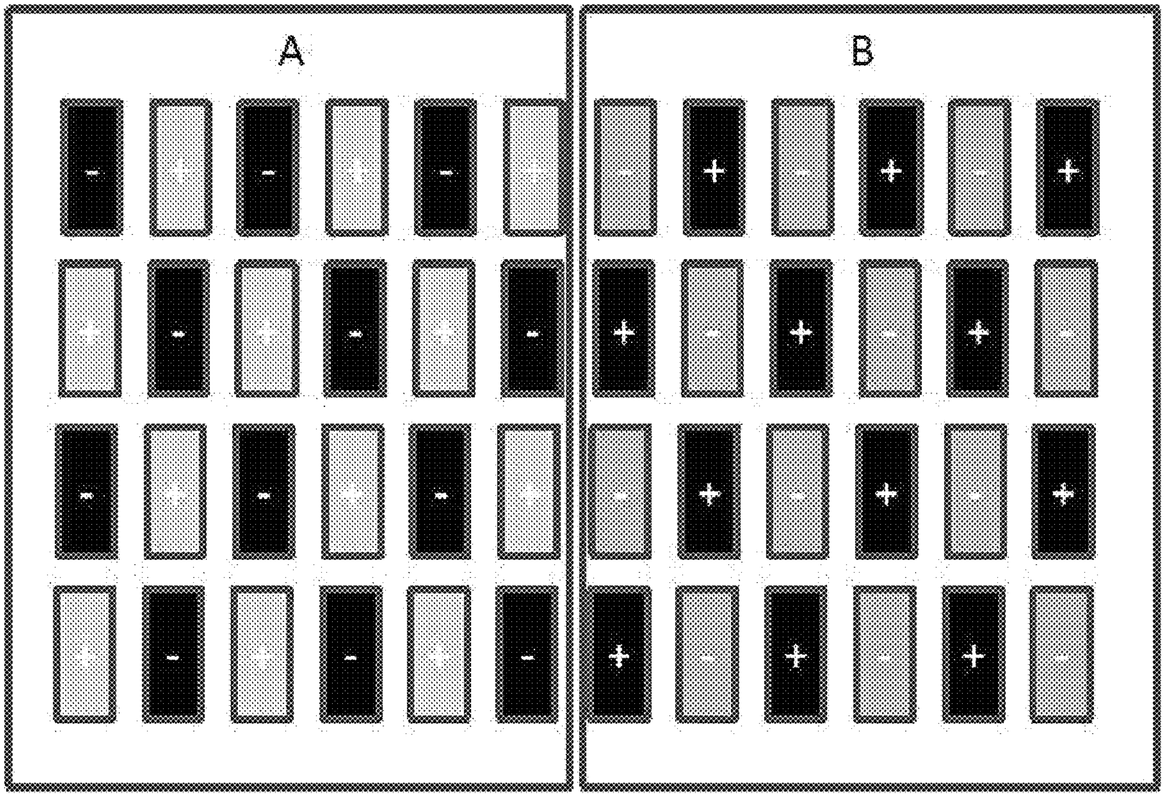
FIG. 8 is a schematic structural diagram of a pixel cell according to an embodiment of the present disclosure.
Figure 9:
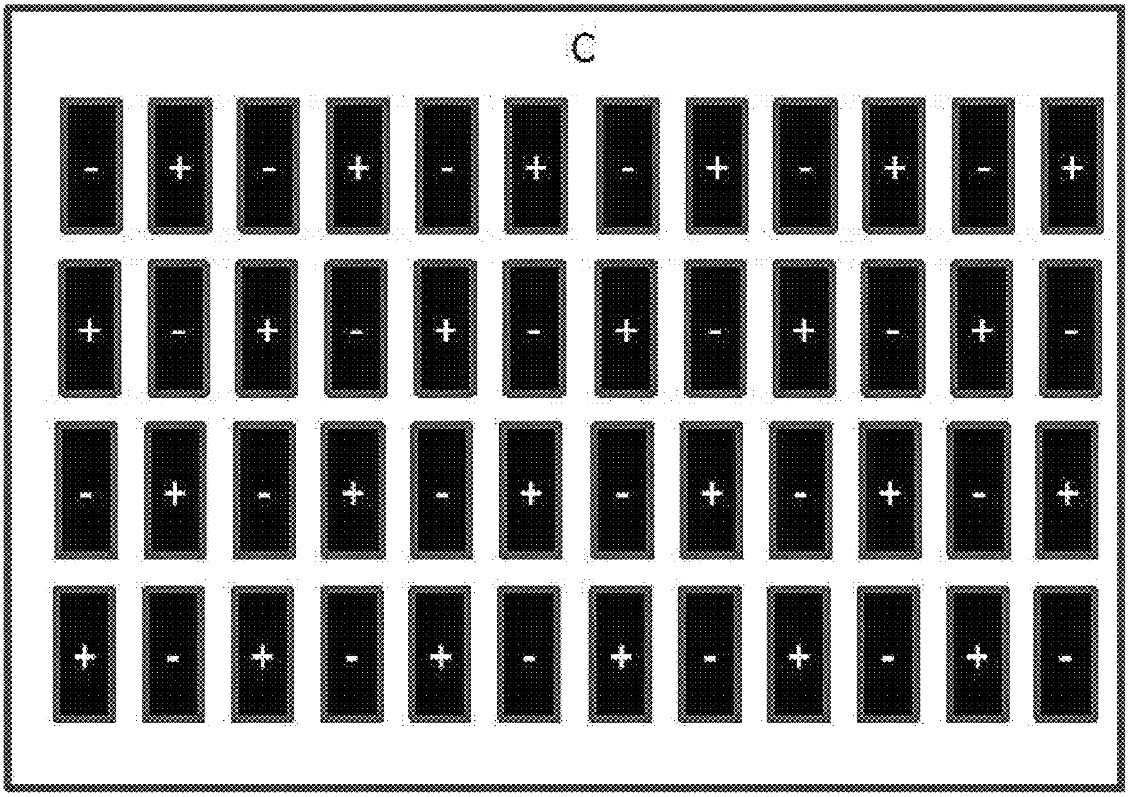
FIG. 9 is a schematic structural diagram of another pixel cell according to an embodiment of the present disclosure.

Specifically, FIGS. 8 and 9 show specific structures of pixel cells, and it can be seen that each pixel cell includes a plurality of first sub-pixels and second sub-pixels having alternating polarities in a row direction and a column direction. The row direction and the column direction include rows and columns. For example, in the pixel cells shown in settings A, B, and C, the first row and the third row are alternately repeated with negative polarity (−) and positive polarity (+); the second row and the fourth row are alternately repeated with positive polarity (+) and negative polarity (−).

It should be noted that the pixel cells shown in settings A and B are described by using only the sub-pixels of 4*4 as an example, and there may be another number of sub-pixels that are arranged in an array. For example, each pixel cell may also include at least 9 sub-pixels arranged in an array, the at least 9 sub-pixels having three different colors, in order to spatially effect the mixed color display.

In FIG. 8, sub-pixels of the negative polarity are taken as the first sub-pixels and sub-pixels of the positive polarity are taken as the second sub-pixels. As depicted in the pixel cell shown in setting A, all of the first sub-pixels are displayed in a zero grayscale, and all of the second sub-pixels are displayed in a non-zero grayscale. Since luminance of the sub-pixels displayed in the zero grayscale is very low (about 0.3 nit), in this case, it is difficult for the human eye to recognize the polarity of the sub-pixels displayed in the zero grayscale, and therefore, the pixel cell shown in setting A has a single polarity, that is, a positive polarity.

Similarly, as depicted in the pixel cell shown in setting B adjacent to the pixel cell shown in setting A, it can be seen that all of the first sub-pixels are displayed in a non-zero grayscale, and all of the second sub-pixels are displayed in a zero grayscale. Since luminance of the sub-pixels displayed in the zero grayscale is very low (about 0.3 nit), in this case, it is difficult for the human eye to recognize the polarity of the sub-pixels displayed in the zero grayscale, and therefore, the pixel cell shown in setting B has a single polarity, that is, a negative polarity.

It will be appreciated that in other embodiments, the polarities of the pixel cell shown in setting A and the polarity of the pixel cell shown in setting B may also be interchanged.

In FIG. 9, in the case where all of the first sub-pixels and all of the second sub-pixels located in the central region of the liquid crystal display panel are displayed at a zero grayscale, the plurality of pixel cells can display a black picture or an all-black picture. The pixel cell shown in setting C may be construed to be a sum of the pixel cell shown in setting A and the pixel cell shown in setting B.

Figure 10:
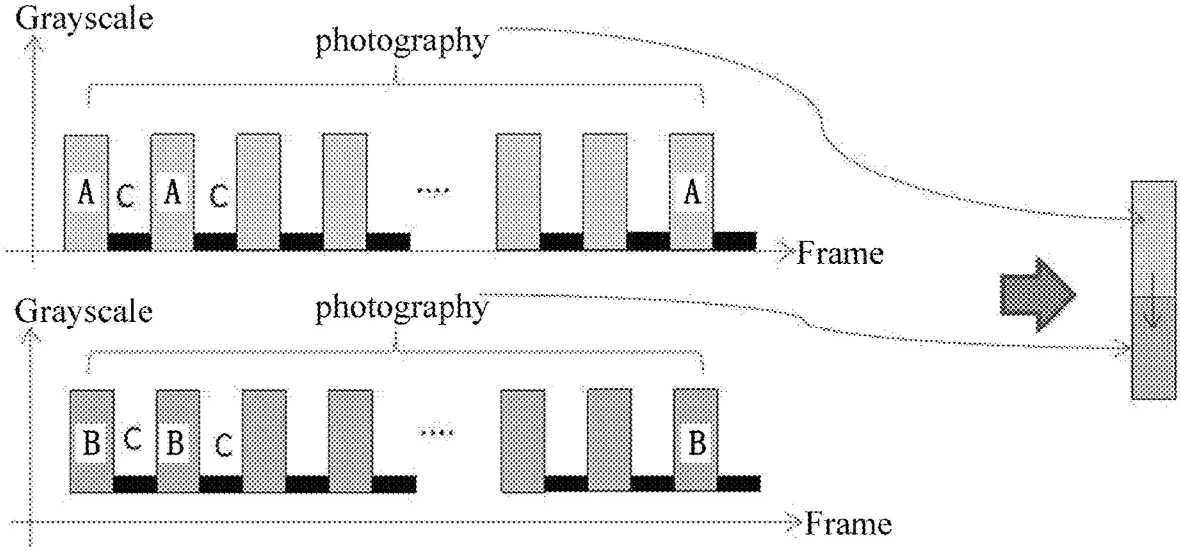
FIG. 10 is a schematic diagram of a capturing and acquiring of grayscales according to an embodiment of the present disclosure.

As shown in FIG. 10, the grayscale of the pixel cell shown in A and the grayscale of the pixel cell shown in B and the corresponding luminance may be obtained by photographing, and since the polarity displayed by the pixel cell shown in A and the polarity displayed by the pixel cell shown in B are different, if there is a luminance difference between the pixel cell shown in A and the pixel cell shown in B, a boundary line will be seen at the junction of the pixel cell shown in A and the pixel cell shown in B.

In this case, by controlling a shutter time of the camera, it is possible to acquire grayscale of multiple frames at one time. For example, a refresh frequency of the liquid crystal display panel is 60 Hz, that is, 60 frames per second, and the shutter time is set to 1 second, so that when a photosensitive chip of the camera continuously senses light (this process is similar to integration), a luminance of the 60 frames may be obtained.

The grayscale of the pixel cell shown in A and the grayscale of the pixel cell shown in B may be simultaneously obtained from some of the frames to obtain the luminance corresponding to the grayscale. The grayscale of the pixel cell shown in C may be obtained from other frames, and the grayscale is correspondingly displayed as a black picture.

Figure 11:
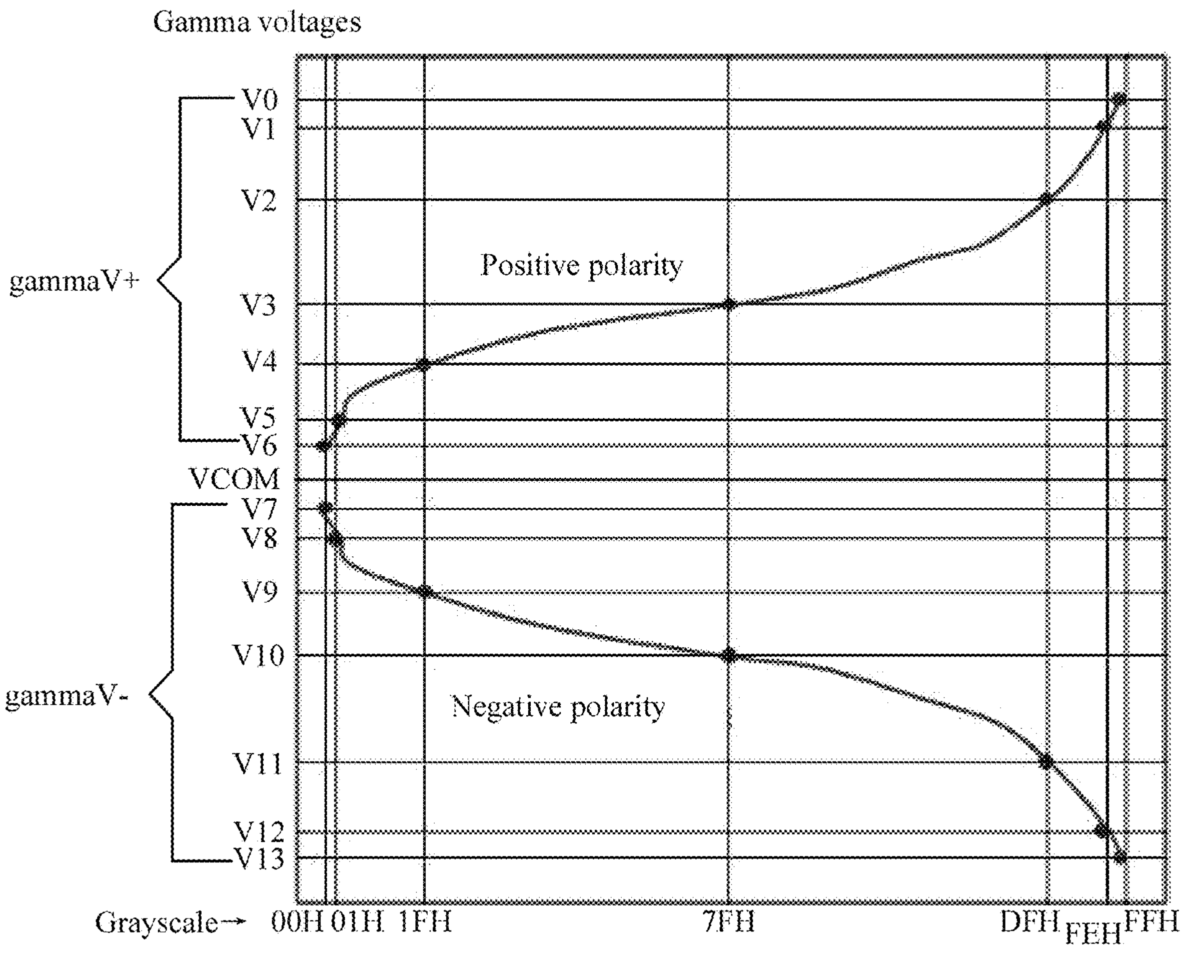
FIG. 11 is a schematic diagram of a curve of an original relation between gamma voltages and grayscales according to an embodiment of the present disclosure.

A curve of a relation between grayscales and gamma voltages is shown in FIG. 11, where a horizontal axis represents the grayscale, for example, 00H-FFH represents the 0-255 grayscale, and a vertical axis represents gamma voltages divided into gamma voltages during positive half-cycles showing a positive polarity (gammaV+) and gamma voltages during negative half-cycles showing a negative polarity (gammaV−). A common voltage (VCOM) is greater than the gamma voltages during the negative half-cycles (gammaV−) and less than the gamma voltages during the positive half-cycles (gammaV+).

Figure 12:
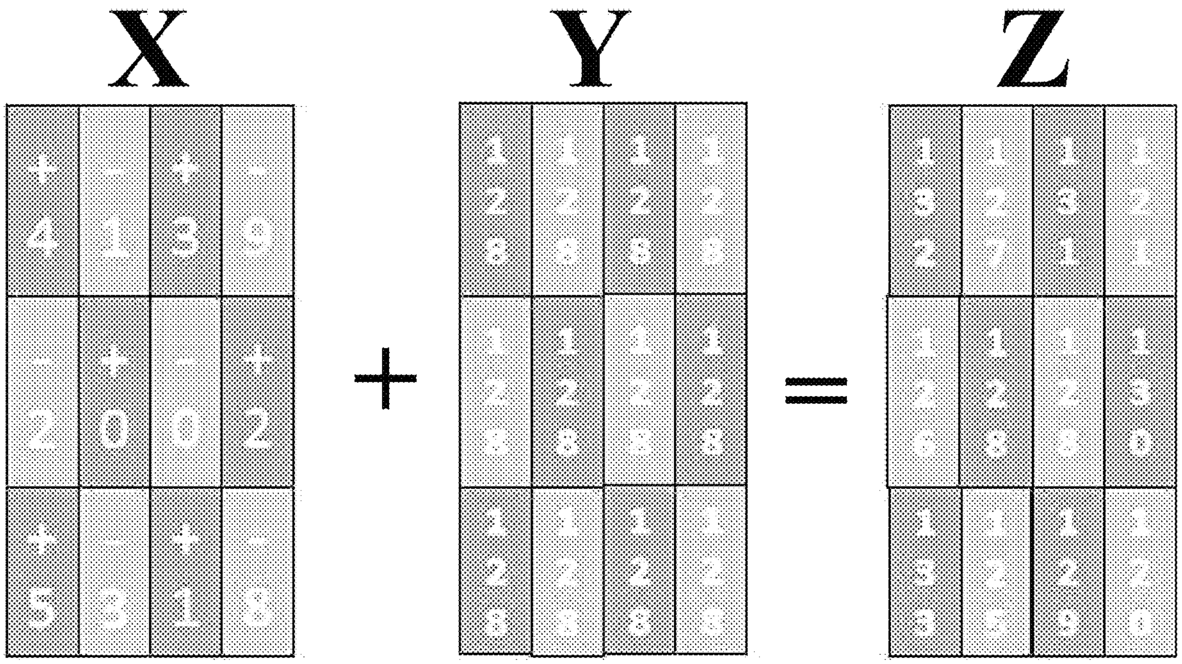
FIG. 12 is a schematic diagram of grayscale compensation according to an embodiment of the present disclosure.

In FIG. 12, each of the three large blocks from left to right shows a pixel cell arranged in an array in the central region shown in FIG. 7, that is, a pixel cell shown in A and a pixel cell shown in B arranged in the array in the upper right corner in FIG. 7. Here, in the first large block from left to right, grayscale compensation is denoted by X, where "+" denotes an increase in an adjustment direction of the grayscale compensation, "−" denotes a decrease in the adjustment direction of the grayscale compensation, and numerals denote specific values of the grayscale compensation. A target grayscale corresponding to each pixel cell is denoted by Y Z is a sum of X and Y.

For example, for the pixel cell in the first row and the first column in each large block, the target grayscale is 128 and the grayscale compensation is +4, and a compensated grayscale is Z=X+Y=128+4=132. For the pixel cell in the first row and the second column in each large block, the target grayscale is 128, and the grayscale compensation is −1, and the compensated grayscale is Z=X+Y=128−1=127. Other pixel cells may be analogous, and will not be repeated one by one.

Herein, the target grayscale may be any value in the 0-255 grayscale, which may optimize flicker corresponding to the target grayscale.

The numerical values shown in FIG. 12 are exemplary, and are not limited thereto.

Figure 13:
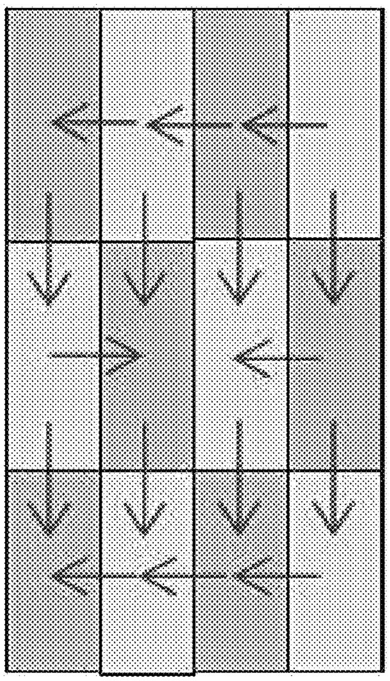
FIG. 13 is a schematic diagram of grayscale differences according to an embodiment of the present disclosure.

In FIG. 13, a head and a tail of each arrow represent two pixel cells for which luminance comparison may be performed. Since different pixel cells are assigned different grayscales, grayscale differences between adjacent pixel cells are obtained according to the grayscale of each pixel cell, and a minimum grayscale difference is determined from the grayscale differences between the adjacent pixel cells. Two pixel cells with the minimum luminance difference may then be found according to the minimum grayscale difference.

Luminance differences due to positive and negative polarities between adjacent pixel cells and adjusted grayscale differences form a number of demarcations at junctions between two pixel cells crossed by arrows as shown in FIG. 13.

It will be appreciated that the grayscale of each pixel cell may be derived from the corresponding frame grayscale data.

Figure 14:
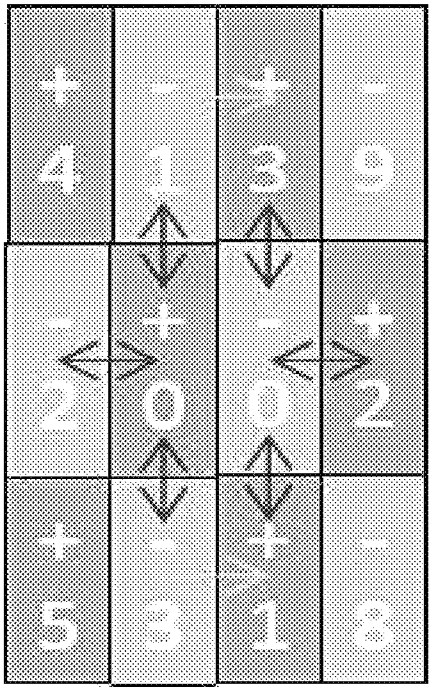
FIG. 14 is a schematic diagram of a first effect of grayscale differences according to an embodiment of the present disclosure.

It should be noted that the above-mentioned demarcation may be used to determine whether there is distortion in the camera photographing. As shown in FIG. 14, the grayscale difference between the grayscale compensation (−1) of the pixel cell shown in the second column in the first row and the grayscale compensation (+3) of the pixel cell shown in the third column in the first row, and the grayscale difference between the grayscale compensation (−3) of the pixel cell shown in the second column in the third row and the grayscale compensation (+1) of the pixel cell shown in the third column in the third row may be considered to be equal.

The grayscale difference between the grayscale compensation (−2) of the pixel cell shown in the first column in the second row and the grayscale compensation (+0) of the pixel cell shown in the second column in the second row, and the grayscale difference between the grayscale compensation (−0) of the pixel cell shown in the third column in the second row and the grayscale compensation (+2) of the pixel cell shown in the fourth column in the second row may be considered to be equal.

The grayscale difference between the grayscale compensation (−1) of the pixel cell shown in the first row in the second column and the grayscale compensation (+0) of the pixel cell shown in the second row in the second column, and the grayscale difference between the grayscale compensation (+1) of the pixel cell shown in the third row in the third column and the grayscale compensation (−0) of the pixel cell shown in the second row in the third column may be considered to be equal.

The grayscale difference between the grayscale compensation (+3) of the pixel cell shown in the first row in the third column and the grayscale compensation (−0) of the pixel cell shown in the second row in the third column, and the grayscale difference between the grayscale compensation (−3) of the pixel cell shown in the third row in the second column and the grayscale compensation (+0) of the pixel cell shown in the second row in the second column may be considered to be equal.

Edge gradient values of the two pixel cells whose grayscale differences are equal are theoretically equal, in this case, the camera takes a picture without distortion. Conversely, distortion occurs.

When at least one of the above grayscale differences exceeds a threshold value, for example, 1-2 grayscale, it indicates that there is distortion in the camera photographing.

The grayscale difference refers to the grayscale compensation of the "+" pixel cell minus the grayscale compensation of the "−" pixel cell. For example, the grayscale difference between the grayscale compensation (−2) of the pixel cell shown in the first column in the second row and the grayscale compensation (+0) of the pixel cell shown in the second column in the second row is (+0)−(−2)=2; the grayscale difference between the grayscale compensation (−0) of the pixel cell shown in the third column in the second row and the grayscale compensation (+2) of the pixel cell shown in the fourth column in the second row is (+2)−(−0) =2

Figure 15:
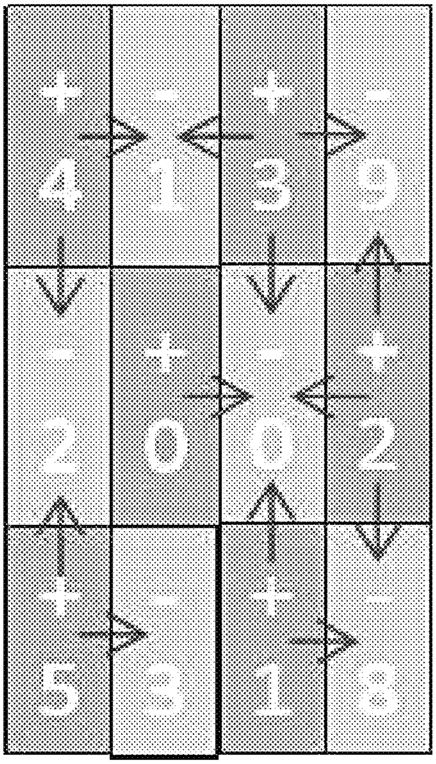
FIG. 15 is a schematic diagram of a second effect of grayscale differences according to an embodiment of the present disclosure.

As shown in FIG. 15, unlike FIG. 14, the double-headed arrows are changed to single-headed arrows, and the single-headed arrow shown in FIG. 15 indicates the grayscale difference obtaining process, that is, the grayscale compensation of the pixel cell in which the tail of the single-headed arrow is located subtracts the grayscale compensation of the pixel cell in which the head of the single-headed arrow is located. The above demarcation may also be used to obtain a minimum grayscale difference by determining a minimum edge gradient value (indicating a minimum luminance difference and a minimum flicker value), and to obtain an optimal correction value for a common voltage based on the minimum grayscale difference without performing multiple iterations.

The edge gradient value may be a grayscale difference value or a grayscale difference.

Figure 16:
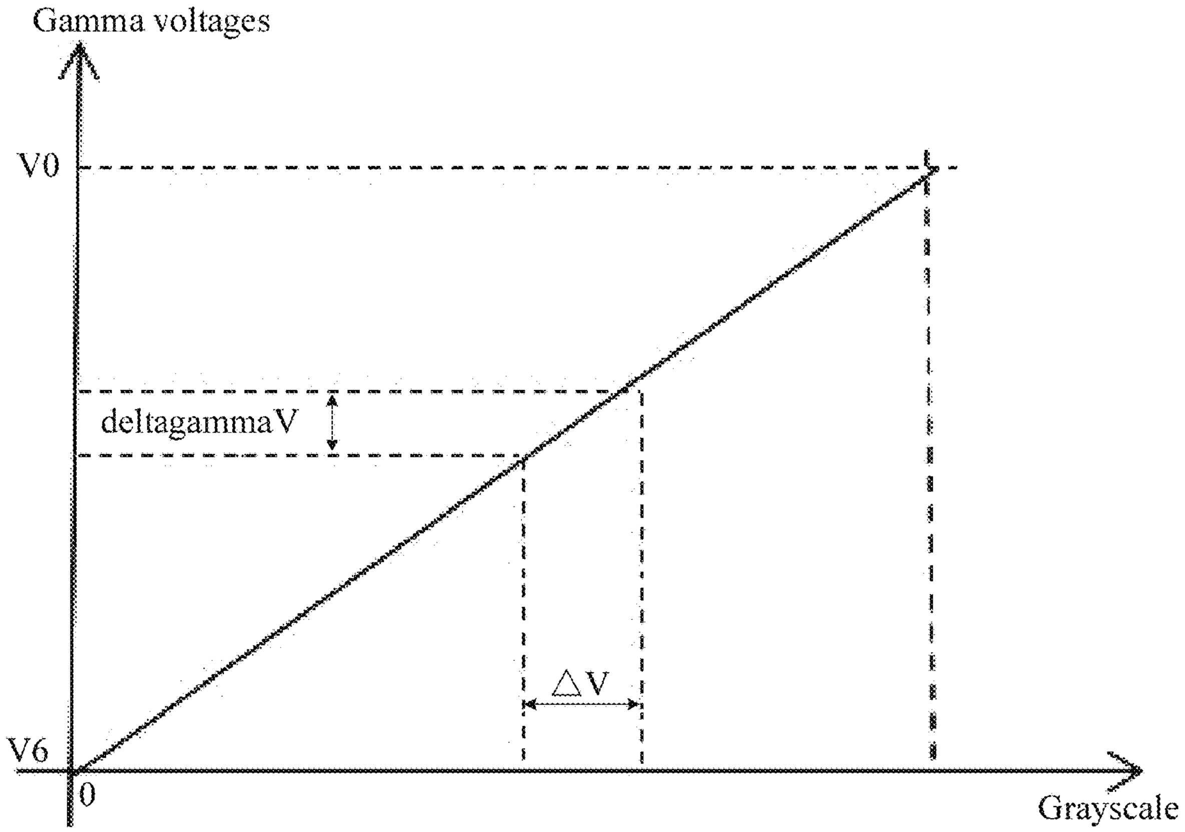
FIG. 16 is a schematic diagram of a curve of a simplified relation between gamma voltages and grayscales according to an embodiment of the present disclosure.

For convenience of calculation and description, the curve of the relation in FIG. 11 is changed to a straight line shown in FIG. 16, and based on FIG. 16, it can be determined that a gamma voltage difference is as shown in Equation (1-1):

$$deltagamma\ V=(V0-V6)*\Delta V/255 \tag{1-1}$$

where deltagammaV is the gamma voltage difference, V0 is a maximum value of gamma voltages during positive half-cycles, V6 is a minimum value of gamma voltages during the positive half-cycles, and ΔV is the minimum grayscale difference.

The correction value for the common voltage is then determined to be one-half of the gamma voltage difference. Then, the correction value is added to the initial common voltage to obtain a target common voltage. In the positive half-cycles, the target common voltage and gamma voltages during positive half-cycles are used to control the twisting of the liquid crystal, while in the negative half-cycles, the target common voltage and gamma voltages during negative half-cycles are used to control the twisting of the liquid crystal, thereby reducing the luminance difference between the positive and negative half-cycles and thereby reducing the flicker value.

In one embodiment, the present embodiment provides a liquid crystal display panel that performs the compensation method in the at least one embodiment described above.

It will be appreciated that since the liquid crystal display panel according to the present embodiment performs the compensation method in at least one of the above-described embodiments, it is likewise possible to acquire a plurality of consecutive and alternating odd-numbered frame grayscale data and even-numbered frame grayscale data in the first place, with every two adjacent pixel cells of a plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data. A minimum grayscale difference between every adjacent pixel cells is determined based on one of the odd-numbered frame grayscale data or the even-numbered frame grayscale data. Then, a gamma voltage difference corresponding to the grayscale difference is determined according to a curve of a relation between grayscales and gamma voltages, followed by obtaining a correction value for a common voltage based on the gamma voltage difference. A flicker phenomenon can be improved by adjusting the common voltage only once through the correction value without requiring multiple iterations with low efficiency.

Also, the improvement in flicker can also be accomplished by dynamic pictures such as a plurality of consecutive and alternating odd-numbered frame grayscale data and even-numbered frame grayscale data, which extends types of flicker pattern required to adjust the flicker, as compared to the case where flicker is generally adjusted using a fixed flicker pattern.

Also, a plurality of consecutive and alternating odd-numbered frame grayscale data and even-numbered frame grayscale data can be acquired by one shot of a camera. A corresponding grayscale difference that can be identified based on the odd-numbered frame grayscale data and even-numbered frame grayscale data is used as a basis for determining the magnitude of a flicker value, which reduces the frequency of usage of an optical instrument compared with the conventional way in which the flicker value is measured by the corresponding optical instrument, thereby improving the efficiency of flicker adjustment.

In the above-mentioned embodiments, the description of each embodiment has its own emphasis, and parts not described in detail in a certain embodiment may be referred to the related description of other embodiments.

The liquid crystal display panel and the compensation method thereof provided in the embodiments of the present disclosure have been described in detail. The principles and embodiments of the present disclosure have been described by using specific examples. The description of the above embodiments is merely intended to help understand the technical solution and the core idea of the present disclosure. It will be appreciated by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the embodiments of the present disclosure.

What is claimed is:

1. A compensation method for a liquid crystal display panel, wherein the liquid crystal display panel comprises a plurality of pixel cells arranged in an array, each pixel cell including a plurality of sub-pixels having alternating polarities in a row direction and a column direction, the compensation method comprising:

acquiring a plurality of consecutive and alternating odd-numbered frame grayscale data and even-numbered frame grayscale data, every two adjacent pixel cells of the plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data;

determining a minimum grayscale difference between every adjacent pixel cells based on one of the odd-numbered frame grayscale data or the even-numbered frame grayscale data;

determining a gamma voltage difference corresponding to the grayscale difference according to a curve of a relation between grayscales and gamma voltages; and obtaining a correction value for a common voltage based on the gamma voltage difference, wherein determining the gamma voltage difference corresponding to the grayscale difference according to the curve of the relation between grayscales and gamma voltages comprises:

setting the gamma voltage into a positive half-cycle gamma voltage and a negative half-cycle gamma voltage;

setting the common voltage to be greater than the negative half-cycle gamma voltage and less than the positive half-cycle gamma voltage;

determining the gamma voltage difference according to Equation (1-1):

$$\text{deltagamma}V=(V0-V6)*\Delta V/255 \quad (1\text{-}1)$$

where deltagammaV is the gamma voltage difference, V0 is a maximum value of the positive half-cycle gamma voltage, V6 is a minimum value of the positive half-cycle gamma voltage, and ΔV is the minimum grayscale difference.

2. The compensation method of claim 1, wherein each pixel cell includes a plurality of first sub-pixels and a plurality of second sub-pixels having alternating polarities in a row direction and a column direction, and wherein the every two adjacent pixel cells each having the single opposite polarity in the one of the odd-numbered frame grayscale data or the even-numbered frame grayscale data comprises:

setting all the first sub-pixels and all the second sub-pixels in one pixel cell to be displayed at a zero grayscale and a non-zero grayscale, respectively;

setting all the first sub-pixels and all the second sub-pixels in another adjacent pixel cell to be displayed at a non-zero grayscale and a zero grayscale, respectively.

3. The compensation method of claim 2, wherein the plurality of pixel cells displaying the black picture in the another one of the odd-numbered frame grayscale data or the even-numbered frame grayscale data comprises:

setting all the first sub-pixels and all the second sub-pixels in each pixel cell to be displayed at a zero grayscale.

4. The compensation method of claim 2, wherein each pixel cell includes the plurality of first sub-pixels and the plurality of second sub-pixels having alternating polarities in the row direction and the column direction, comprising:

setting the first sub-pixels and the second sub-pixels to be alternately distributed in the row direction and the column direction;

configuring one of each of the first sub-pixels or each of the second sub-pixels to have a positive polarity, and another one of each of the first sub-pixels or each of the second sub-pixels to have a negative polarity.

5. The compensation method of claim 1, wherein the step of determining the minimum grayscale difference between every adjacent pixel cells based on the one of the odd-numbered frame grayscale data or the even-numbered frame grayscale data comprises:

obtaining grayscales of each pixel cell based on the one of the odd-numbered frame grayscale data or the even-numbered frame grayscale data;

obtaining grayscale differences between every adjacent pixel cells according to grayscales of each pixel cell;

determining the minimum grayscale difference from the grayscale differences between every adjacent pixel cells.

6. The compensation method of claim 1, wherein the step of obtaining the correction value of the common voltage based on the gamma voltage difference comprises:

determining one half of the gamma voltage difference as the correction value.

7. The compensation method of claim 6, wherein after the step of obtaining the correction value of the common voltage based on the gamma voltage difference, the method further comprises:

adding the correction value to an initial common voltage to obtain a target common voltage;

controlling torsion of liquid crystals based on the target common voltage, the positive half-cycle gamma voltage, and the negative half-cycle gamma voltage.

8. The compensation method of claim 1, wherein each pixel cell includes at least 9 sub-pixels in an array distribution, the at least 9 sub-pixels having three different colors.

9. The compensation method of claim 2, wherein each pixel cell includes at least 9 sub-pixels in an array distribution, the at least 9 sub-pixels having three different colors.

10. A liquid crystal display panel that performs a compensation method, wherein the liquid crystal display panel comprises a plurality of pixel cells arranged in an array, each pixel cell including a plurality of sub-pixels having alternating polarities in a row direction and a column direction, the compensation method comprising:

acquiring a plurality of consecutive and alternating odd-numbered frame grayscale data and even-numbered frame grayscale data, every two adjacent pixel cells of the plurality of pixel cells each having a single opposite polarity in one of the odd-numbered frame grayscale data or the even-numbered frame grayscale data, and the plurality of pixel cells displaying a black picture in another one of the odd-numbered frame grayscale data or the even-numbered frame grayscale data;

determining a minimum grayscale difference between every adjacent pixel cells based on one of the odd-numbered frame grayscale data or the even-numbered frame grayscale data;

determining a gamma voltage difference corresponding to the grayscale difference according to a curve of a relation between grayscales and gamma voltages; and obtaining a correction value for a common voltage based on the gamma voltage difference, wherein determining the gamma voltage difference corresponding to the grayscale difference according to the curve of the relation between grayscales and gamma voltages comprises:

setting the gamma voltage into a positive half-cycle gamma voltage and a negative half-cycle gamma voltage;

setting the common voltage to be greater than the negative half-cycle gamma voltage and less than the positive half-cycle gamma voltage;

determining the gamma voltage difference according to Equation (1-1);

$$\mathrm{deltagamma}V=(V0-V6)*\Delta V/255 \quad (1\text{-}1)$$

where deltagammaV is the gamma voltage difference, V0 is a maximum value of the positive half-cycle gamma voltage, V6 is a minimum value of the positive half-cycle gamma voltage, and ΔV is the minimum grayscale difference.

11. The liquid crystal display panel of claim 10, wherein each pixel cell includes a plurality of first sub-pixels and a plurality of second sub-pixels having alternating polarities in a row direction and a column direction, and wherein the every two adjacent pixel cells each having the single opposite polarity in the one of the odd-numbered frame grayscale data or the even-numbered frame grayscale data comprises:

setting all the first sub-pixels and all the second sub-pixels in one pixel cell to be displayed at a zero grayscale and a non-zero grayscale, respectively;

setting all the first sub-pixels and all the second sub-pixels in another adjacent pixel cell to be displayed at a non-zero grayscale and a zero grayscale, respectively.

12. The liquid crystal display panel of claim 11, wherein the plurality of pixel cells displaying the black picture in the another one of the odd-numbered frame grayscale data or the even-numbered frame grayscale data comprises:

setting all the first sub-pixels and all the second sub-pixels in each pixel cell to be displayed at a zero grayscale.

13. The liquid crystal display panel of claim 11, wherein each pixel cell includes the plurality of first sub-pixels and the plurality of second sub-pixels having alternating polarities in the row direction and the column direction, comprising:

setting the first sub-pixels and the second sub-pixels to be alternately distributed in the row direction and the column direction;

configuring one of each of the first sub-pixels or each of the second sub-pixels to have a positive polarity, and another one of each of the first sub-pixels or each of the second sub-pixels to have a negative polarity.

14. The liquid crystal display panel of claim 10, wherein the step of determining the minimum grayscale difference between every adjacent pixel cells based on the one of the odd-numbered frame grayscale data or the even-numbered frame grayscale data comprises:

obtaining grayscales of each pixel cell based on the one of the odd-numbered frame grayscale data or the even-numbered frame grayscale data;

obtaining grayscale differences between every adjacent pixel cells according to grayscales of each pixel cell;

determining the minimum grayscale difference from the grayscale differences between every adjacent pixel cells.

15. The liquid crystal display panel of claim 10, wherein the step of obtaining the correction value of the common voltage based on the gamma voltage difference comprises:

determining one half of the gamma voltage difference as the correction value.

16. The liquid crystal display panel of claim 15, wherein after the step of obtaining the correction value of the common voltage based on the gamma voltage difference, the method further comprises:

adding the correction value to an initial common voltage to obtain a target common voltage;

controlling torsion of liquid crystals based on the target common voltage, the positive half-cycle gamma voltage, and the negative half-cycle gamma voltage.

17. The liquid crystal display panel of claim 10, wherein each pixel cell includes at least 9 sub-pixels in an array distribution, the at least 9 sub-pixels having three different colors.

18. The liquid crystal display panel of claim 11, wherein each pixel cell includes at least 9 sub-pixels in an array distribution, the at least 9 sub-pixels having three different colors.

* * * * *